Nov. 15, 1938.   W. H. KNISKERN   2,136,693
CONTROL MECHANISM
Original Filed Oct. 10, 1930    2 Sheets-Sheet 2
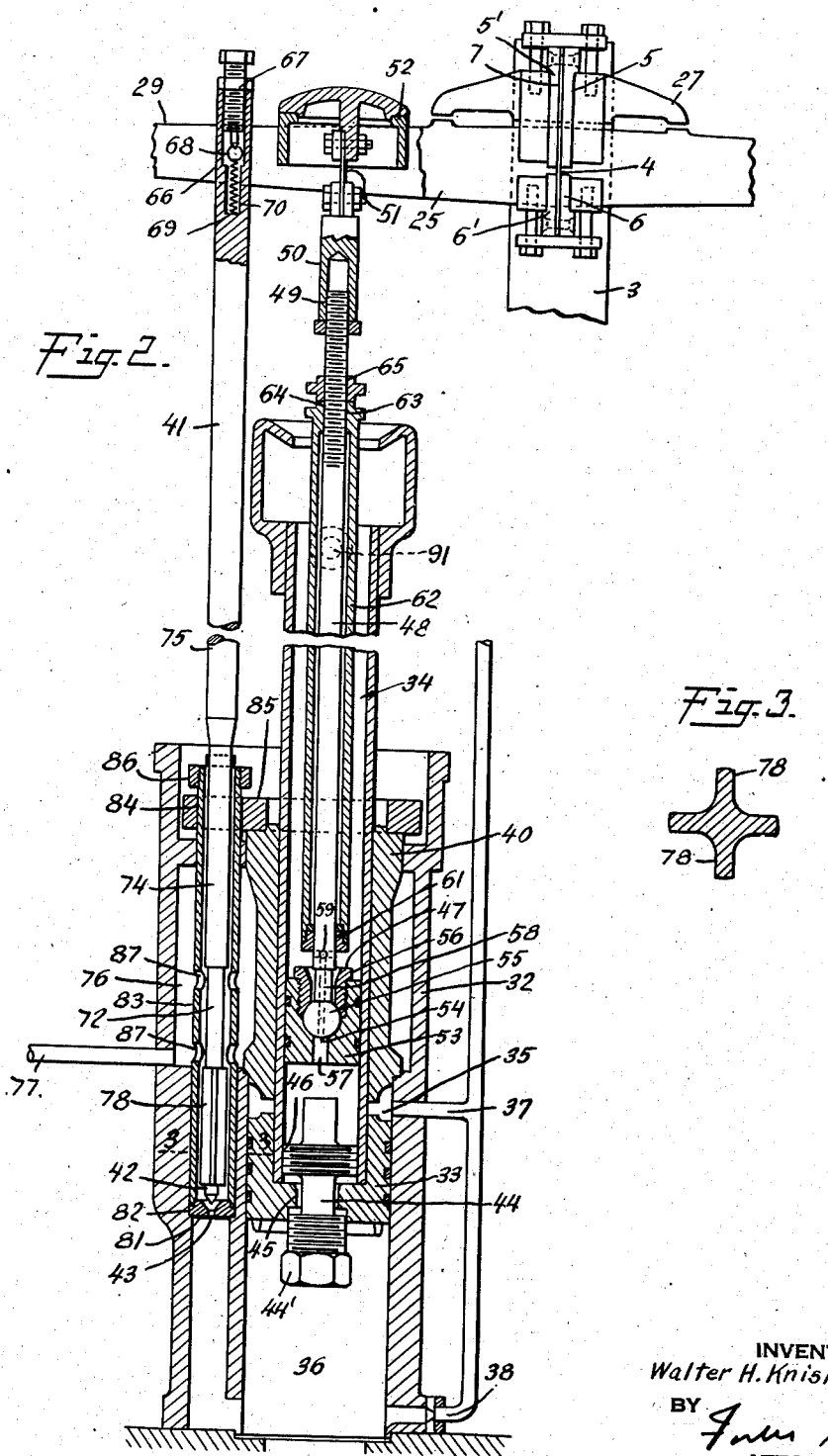
INVENTOR
Walter H. Kniskern
BY
ATTORNEY

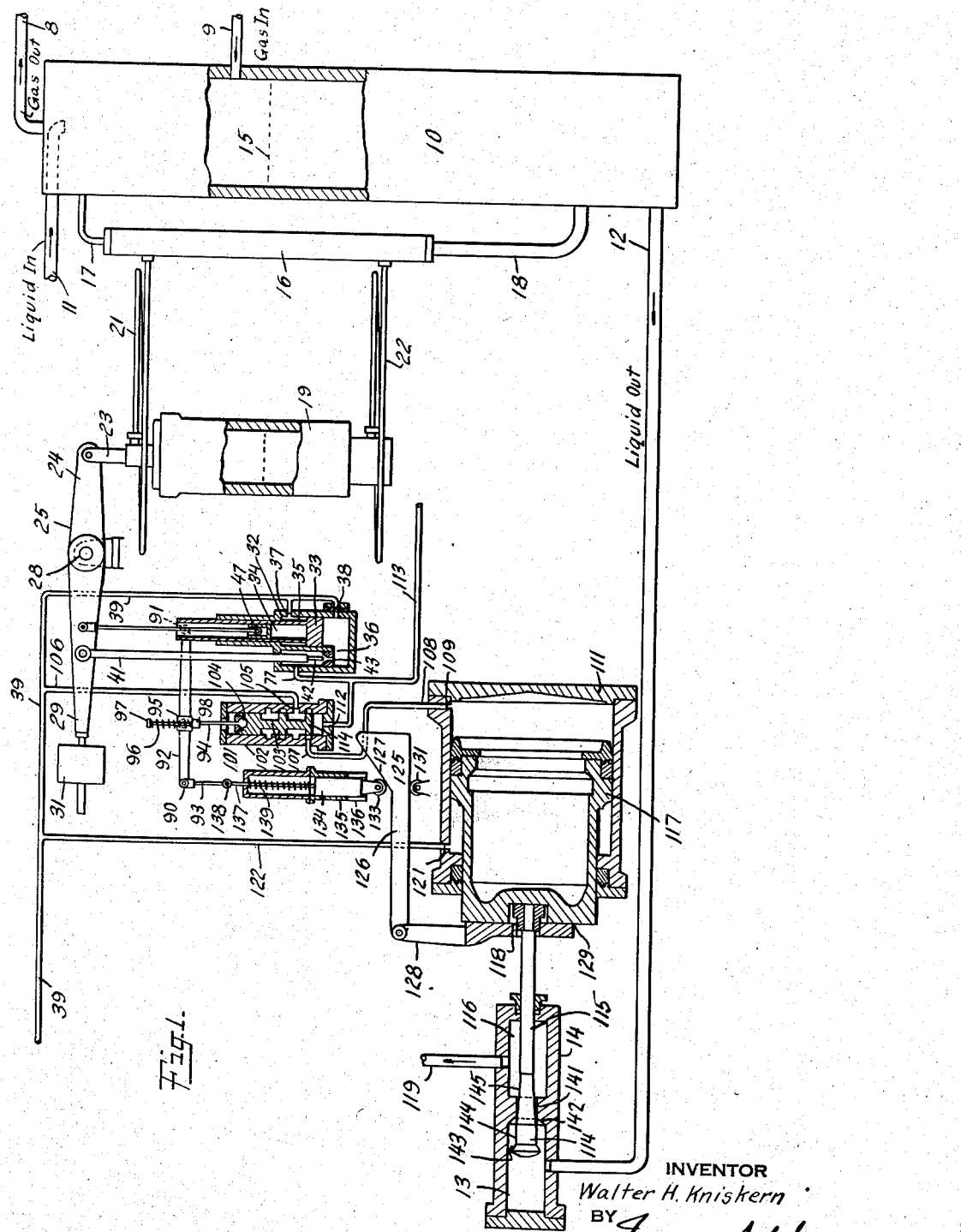

Patented Nov. 15, 1938

2,136,693

UNITED STATES PATENT OFFICE 2,136,693

CONTROL MECHANISM

Walter H. Kniskern, Petersburg, Va., assignor, by mesne assignments, to The Solvay Process Company, New York, N. Y., a corporation of New York Original application October 10, 1930, Serial No. 487,887, now Patent 2,062,095. Divided and this application November 1, 1934, Serial No. 750,955

4 Claims. (Cl. 121—41)

This invention relates to relays and more particularly to relays for control apparatus for maintaining a substantially constant level of liquid in a vessel into and from which liquid is introduced and discharged. The relay of the present invention has been found particularly useful in connection with controls for maintaining a substantially constant liquid level in apparatus under pressure such, for example, as the intercoolers, scrubbers and separators utilized in the synthesis of ammonia. This application is a division of my application Serial No. 487,887, filed October 10, 1930, issued as Patent No. 2,062,095, Nov. 24, 1936.

An object of this invention is to provide an improved relay structure which, while particularly applicable to control apparatus for scrubber and other analogous apparatus, is of general application. Other objects and advantages will appear from the following detailed description.

In the accompanying drawings forming a part of this specification and showing for purposes of examplification a prefered form of this invention but without limiting the claimed invention to such illustrative instance:

Fig. 1 is a somewhat diagrammatic view partly in section of control apparatus embodying the present invention;

Fig. 2 is a fragmentary vertical section partly in elevation of the relay embodying this invention taken in a plane passing vertically through the relay housing and relay piston, a portion of the relay needle and relay piston being broken away as indicated to permit illustration of the apparatus on a somewhat larger scale than would be possible otherwise; and Fig. 3 is a section through the relay needle taken in a plane indicated by the line 3—3 of Fig. 2.

In the drawings referring to Fig. 1, 10 indicates the scrubbing tower or other vessel having an inlet line 11 through which liquid under pressure or a mixture of liquid and gas under pressure passes into the vessel 10. Gas inlet line is indicated by the reference numeral 9 and the gas outlet line by the reference numeral 8. The discharge line 12 leads to the high pressure side 13 of valve 14 which controls the flow of liquid from the vessel. Dotted line 15 in vessel 10 indicates the height of the level of liquid it is desired to maintain in the vessel. Adapter column 16 has its top connected by tube 17 to the gas space in the vessel 10 and its base connected by tube 18 to the base of the tower or vessel 10 so that the level of liquid in the adapter column is the same as in vessel 10. The adapter column provides an indirect connection between weigh bottle 19 and tower or vessel 10. If desired, direct connections between weigh bottle and the gas and liquid spaces in vessel 10 may be used. The weigh bottle 19 preferably in the form of a cylinder has its top connected by flexibles 21 with the top of the adapter column 16 and its base connected by flexibles 22 with the liquid space in the column 16. Hence, the level of liquid within the weigh bottle is the same as in the adapter column and in the vessel 10.

Weigh bottle 19 is pivoted to one end of balance beam 25. The balance beam may be fulcrumed on any suitable bearings. In Fig. 2 a preferred type of suspension is illustrated. This suspension consists of tensioned spring steel strips 7, one at each side of the balance beam. The bottom of each of these strips is clamped between blocks 6 and 6', which are riveted together, and the tops between blocks 5 and 5', which are riveted together, leaving an intermediate free flexible portion 4. Blocks 5 and 6 are suitably secured to standard 3. The free flexible portion 4 of the strip constitutes the fulcrum point 28 of the balance beam. This type of suspension is nearer frictionless than a journal bearing, a ball bearing or a knife edge bearing and consequently, is preferred. It will be understood, however, that other types of bearing may be used. Stops 27 (Fig. 2) mounted on standard 3 and extending over the top of fulcrum point 28 of the balance beam 25 limit the rocking movement of the beam in both directions. End 29 of the balance beam is provided with an adjustable counterweight 31. Variations of liquid level in the vessel 10, it will be noted, cause corresponding variations of level in bottle 19, consequently increasing or diminishing the effective weight of the bottle and thus rocking end 29 of the balance beam either upwardly or downwardly.

The relay comprises a relay housing 32 having stepped piston 33—34 therein, the stepped piston being made up of piston 33 and hollow rod 34. The area of the upper surface of the piston 33 bears a definite ratio to the area of the lower surface, usually about one-half. The piston 33 remains stationary within the housing 32 only when the pressure of fluid in chamber 35 above the piston 33 bears a definite ratio to the pressure in the chamber 36 beneath the piston 33, depending on the ratio between the areas of the upper and lower surfaces of the piston. Chambers 35 and 36 are supplied with pressure fluid preferably oil through inlet pipe 37 and inlet orifice 38 respectively, both communicating with the pressure fluid supply line 39.

The inlet orifice 38 is preferably made approximately one-half the size of the outlet orifice 43 hereinafter described. A drop in pressure of the pressure fluid, oil, entering chamber 36 takes place due to its flow through the inlet orifice 38, and the drop varies as the square of the flow.

The pressure within the chamber 36 is controlled by relay needle 41 suspended from end 29 of the balance beam. The conical pointed end 42 of the relay needle regulates the discharge through orifice 43 in the chamber 36. With the needle in a definite position with respect to the discharge orifice, in the embodiment herein disclosed, so that the discharge orifice is approximately equal to the inlet orifice, the upward and downward forces on the piston are in equilibrium and the piston 33 remains stationary at a definite point in the relay housing intermediate the top and bottom thereof. Movement of the needle 41 away from the definite position in a downward direction causing end 42 to restrict the discharge through orifice 43 causes pressure to build up in chamber 36 with a consequent upward movement of piston 33. As soon as the equilibrium between forces above and below the piston 33 is restored, the piston stops moving. Conversely upward movement of relay needle 41 by the upward rocking of end 29 of the balance beam 25 away from the aforesaid definite position causes an increase in the escape of pressure fluid through orifice 43 with consequent decrease in pressure in chamber 36 and descent of the piston 33. The relay piston rod 34 moves in a sleeve 40 positioned within the relay housing 32.

The relay housing 32 and associated elements are shown in structural detail in Fig. 2. To permit a ready assembly of the hollow piston rod 34 and piston 33, a bolt 44 is utilized which makes threaded engagement as indicated at 46 with the interior of the hollow rod, the small end of the bolt passing through opening 45 in piston 33, and is secured by nut 44'. A dash pot 47 is provided within the hollow piston rod to regulate the speed of movement of piston 33 and rod 34. The dash pot stem 48 has its end 49 in threaded engagement with the interior of casing 50 suitably suspended from an arm 51 bolted or otherwise secured to a support 52 carried by the balance beam 25. Stem 48 is connected to dash pot piston 53 through ball joint 54, the ball 55 integral with or secured to rod 48 being held in position in its seat in the dash pot piston 53 by nut 56.

The base of the dash pot piston is provided with a vertical opening 57 which aligns with the vertical channel or opening 58 passing through ball 55 and the end of dash pot rod 48. Cross drill openings 59 communicate with opening 58 and with the interior of chamber 54 which preferably is filled with oil. A collar 61 brazed or otherwise secured to a long sleeve 62 concentric with the dash pot piston 48 is positioned in the neighborhood of the cross drill openings and is adapted to be moved to cover more or less of the cross drill openings and thus regulate the effective extent of openings 59. Collar 61 is moved by the long sleeve 62, the interior of the top 63 of which is in threaded engagement with threads 64 on the dash pot rod 48. A lock nut 65 maintains the sleeve 62 in adjusted position. The long sleeve 62 provides an accessible means of regulating the extent of the cross drill openings 59. Increasing the extent of the cross drill openings permits an increased rate of flow of fluid from one side of the dash pot piston to the other and consequently results in a more rapid movement of the stepped piston 33. Conversely, decreasing the extent of the cross drill openings 59 by moving the collar 61 thereover, retards the movement of the stepped piston 33.

Relay needle 41 is connected with balance beam 25 by the flexible joint 66 involving bolt 67 threaded into the interior of the top of needle 41 and engaging pin 68 integral with or secured to the balance beam. A spring 69 is confined in the housing 70 within the needle 41, the spring contacting with the pin 68 and thus providing a flexible connection between the needle 41 and the balance beam.

As above indicated, end 42 of the needle is formed of conical configuration, the cone, when seated within the discharge orifice completely closing this orifice. Portion 72 of the needle merges into portion 74 of greater diameter which in turn merges into a portion 75 of greatest diameter.

In practice it has been found that the usual cylindrical needle vibrates in the discharge orifice in a manner similar to an organ reed vibrating in a current of air. Vibrations of the needle introduce a disturbing influence in the operations of the control and interfere with satisfactory operation. I have found that vibration of the needle may be eliminated by providing the needle with extensions or wings, such as are shown at 78, Figs. 2 and 3. These wings operate in a bath of oil maintained below overflow pipe 77. These wings are located as near the point of the needle as may be convenient and in the embodiment disclosed are about four inches long and project about one-quarter or three-eighths of an inch beyond the cylindrical portion of the needle. In practice, it has been found that a needle provided with the extensions or wings herein disclosed does not vibrate, the extensions or wings coacting with the fluid and exerting a dampening effect.

The orifice 43, it will be noted, consists of a member provided with a restricted opening 81, the member resting on shoulders 82 in chamber 76. A sleeve 83 extends through opening 84 in cover 85 which secures the aforementioned bearing support 40 for the piston rod 34 within the relay housing 32. The sleeve 83 extends the full length of chamber 76, has one end brazed to orifice 43 and the other end provided with a collar 86 threaded thereon and accessible from the top of the housing. The sleeve extends concentrically about the needle and wings and is of sufficient diameter to avoid contacting the wings. Sleeve 83 permits ready removal of the orifice plate 43 for cleaning or other purposes. A similar sleeve construction may be provided in connection with orifice 38, hereinbefore described, to permit ready removal of the orifice. Openings 87 are formed in the sleeve 83, above wings 78, and permit flow of oil or other pressure fluid through the orifice 43 into chamber 76 out through the drain pipe 77.

Pivoted to the body of the piston rod 34 as indicated at 91, is one end of a floating lever 92 (Fig. 1). The other end of the floating lever 92 is pivoted, as indicated by the reference numeral 90, to the top of the cam rod stem 93 hereinafter more fully described. A valve stem 94 is associated with an intermediate point on the floating lever. The stem 94 passes through a block 95 integral with or secured to the lever 92. A spring 96 is coiled about the stem 94 and has one end contacting with the block 95 and the other end bearing against head 97 of the stem 94. Collar 98 on the stem 94 contacts with block 95 when it is moved downwardly, imparting downward motion to the stem 94. A relay or pilot valve 101 involves the usual valve housing 102 and has the valve spool 103 slidably mounted therein. Valve stem 94 is connected with spool 103 through ball joint 104.

The relay valve is formed with pressure inlet port 105, which communicates with pressure fluid supply line 106 in turn connected with pressure fluid pipe 39. Port 107 in the valve housing communicates through pipe line 108 with port 109 in the servo-motor 111. A drain port 112 in the base of the relay valve communicates with the drain line 113 into which the drain pipe 77 from the relay housing also leads. Flange 114 on the valve spool is of an extent sufficient to close the valve port 107 as indicated in Fig. 1. Movement of the valve spool downwardly places ports 105 and 107 into communication resulting in flow of pressure fluid from pipe 106 into ports 105, 107, through pipe 108 into port 109 into the servo-motor 111. Movement of the valve spool 103 in an upward direction places port 107 into communication with exhaust port 112 and causes exhaust of pressure fluid from servo-motor 111 through port 109, pipe 108, ports 107 and 112 into exhaust pipe 113.

Movement of the valve spool is effected through stem 94 and the floating lever 92 which is in turn moved by the piston rod 34. Thus, when the rod 34 moves up, it rocks the floating lever 92 about the pivot point 90 and through spring 96 pulls up on stem 94, causing the stem and connected valve spool 103 to move upwardly. When the piston rod 34 descends, it causes downward rocking of lever 92 about the pivot point 90, moving stem 94 and the connected valve spool downwardly through contact of block 95 with the collar 98. As above indicated, movement of the piston rod 38 up or down is caused by changes of liquid level in vessel 10 and weigh bottle 19 which move the relay needle 41 to vary the pressure in chamber 36 below the piston 33.

The servo-motor 111 is of sufficient size to exert the necessary forces for moving the valve stem 114 in the valve 14 against the high pressure occurring in chamber 13 of the valve through which the liquid from vessel 10 flows into the low pressure chamber 116 of the valve 14. The valve stem 114 is preferably made integral with rod 115 which extends through the low pressure chamber 116 and is suitably secured as indicated at 118 to the stepped piston 117 of the servo-motor. Discharge line 119 leads from the low pressure chamber 116 of the valve to a suitable point of disposal for the liquid flowing from the vessel 10.

Oil is supplied at constant pressure to the small end of the stepped piston 117 of the servo-motor through inlet port 121 and pipe 122 which communicates with the supply line 39. The oil pressure on the small end of the stepped piston functions to return the piston when oil is exhausted from the large end. Admission of pressure fluid to the large end of the servo-motor through port 109 causes the servo-motor pistons to move to the left as viewed in Fig. 1, increasing the extent of opening of valve 14 and consequently increasing the flow through this valve. Contrariwise, the exhaust of pressure fluid from the large end of the servo-motor through port 109 permits the oil pressure on the small end of the stepped piston 117 to force it to the right, diminishing the valve opening with consequent decrease in flow from vessel 10 through valve 14 into discharge line 119.

The restoring or compensating mechanism associating the servo-motor 111 with the relay to prevent over-travel of the valve and further to prevent hunting within the system, will now be described. The restoring mechanism involves a cam 125 having a horizontal surface indicated at 126 and an upwardly inclined surface 127. The cam is secured to bracket 128 suitably fastened to stepped piston at 129 so that the bracket 128 and connected cam reciprocate with the piston 117. Guide roll 131 provided with flanges between which the cam moves, provides a guide and support for the reciprocating cam 125.

A cam follower 133, carried by the cylindrical stem 134 slidably guided in housing 135 rides on the cam 125. The base of housing 135 is provided with vertical slots 136 permitting movement of the inclined portion 127 of the cam therethrough. A rod 137 suitably secured to stem 134 extends therefrom and is pivoted as indicated at 138 to the cam rod stem 93. Spring 139 coiled about stem 137 contacts with the top interior of housing 135 and with the cylindrical stem 134 and functions to hold cam roller 133 carried by the stem 134 into engagement with the cam track on cam 125. Movement of the stepped piston toward the left (Fig. 1) from the position indicated occasioned by the valve spool 103 being lowered causing pressure fluid to flow through ports 105, 107 and 109 into servo-motor, causes the cam 125 to move toward the left with a consequent elevation of stem 134, 137 and 93 raising the floating lever 92 about pivot point 91, restoring the valve spool 103 to its original position and thus preventing further introduction of pressure fluid into the servo-motor and consequently avoiding over-travel of valve stem 114 and hunting within the system. The converse of the above operations takes place when the stepped piston is moved to the right. Thus the restoring mechanism prevents over-travel of the valve stem after each impulse imparted to the weigh bottle which is in turn transmitted to the relay controlling the operation of the servo-motor.

The valve seat and stem and the shape of the cam 125 is designed as shown in Fig. 1 to prevent wire drawing in the valve 14 and to insure prompt opening of the valve from closed position with gradual movement of the valve once it is opened. The valve seat is cylindrical as indicated at 141 and is provided with a conical seating portion 142. Valve stem 114 comprises a conical seating portion 143 adapted to register with and seat in 142, a cylindrical closing portion 144 of substantially the same diameter as 141 and arranged to seat within 141 and a truncated conical portion 145 in line with and extending from the closing portion 144. Assuming the valve is in seated position, it will be noted that the high pressure within chamber 13 acts upon the stem and maintains it in seated position. When the valve stem 114 is moved towards the left (Fig. 1), the valve remains closed due to the cylindrical portion 144 remaining within 141 and thus flow through the valve is prevented until the portion 144 is completely removed from the seat 141. Continued movement of the stem causes cylindrical portion 144 to leave its seat 141 and permits flow through the valve. Hence the flow through the valve upon opening same from closed position acts upon the end of cylindrical portion 144 remote from the seat 143 and wire-drawing on the seats 142 and 143 is eliminated.

To permit prompt opening of the valve from closed position, the cam 125 is provided with the horizontal surface 126. With the valve stem 114 in seated position, cam roll 133 rests on surface 126. Initial movement of the stepped piston with a consequent movement of cam 125, causes no movement of cam stem 135 due to the fact that the cam does not cause an upward movement of the roller 133, and consequently does not restore the floating lever 92 and the valve spool 103, hence permitting continued flow of pressure fluid into the servo-motor and a rapid opening movement of the valve 14. Once the valve is opened, the position of the parts is as shown in Fig. 1, cam roller 133 resting on the base of the inclined surface 127. Further movement to the left of the servo-motor piston causes the restoring mechanism to operate to prevent overtravel of the valve stem 114 and hunting within the system as above described.

It will be noted that any motion of the relay piston 34 is followed by a corresponding motion of the servo-motor piston 117 and that for each position of the relay piston 34, there is a corresponding position of the servo-motor piston 117 and consequently a corresponding extent of opening of the valve 14.

In operation, assume that all the parts are in the position indicated in Fig. 1 and that oil pressure is being supplied through pressure supply line 39, and further assume that due to variations in pressure within the vessel 10 or due to an increase in the rate of flow of liquid into the vessel 10, the level rises to a point above the dotted line 15. The level correspondingly rises in the adapter column 16 and weigh bottle 19 causing the effective weight of the bottle to increase. This results in a downward thrust upon the end 24 of the balance beam 25 rocking it about the fulcrum 28. Hence, end 29 of the balance beam and the relay needle 41 carried thereby is moved upwardly increasing the discharge through orifice 43 and consequently diminishing the pressure in chamber 36. Accordingly, piston 33 descends, pressure fluid flowing through cross drill openings 59, openings 58, 57 into the space beneath the dash-pot pistons. By adjusting the position of the collar 61 to regulate the extent of the cross drill openings, the piston 33 is caused to move at the desired speed. The downward movement of the piston rocks the floating lever 92 about pivot point 90, and moves the valve spool through block 95, collar 98 and stem 94 downwardly, causing port 105 to communicate with port 107. Pressure fluid flows through ports 105 and 107 from the pressure supply line 39 into pipe 108, port 109 into the servo-motor 111, causing the servo-motor piston 117 to move towards the left and increase the opening of valve 14, hence increasing the discharge from vessel 10 to cause the level of liquid within the vessel to return to the predetermined point 15. As the stepped piston 117 moves toward the left, the cam 125 moves therewith. Cam surface 127 upon movement of cam 125 causes an upward movement of the cam roller 133 on the cam rod stem 137 and 93, causing the floating lever 92 to move upwardly about pivot point 91. This returns the valve spool 103 to its closed position, preventing further flow of pressure fluid into the servo-motor.

When the level within the vessel 10 falls to a point indicated by the line 15, corresponding changes of level take place in the adapter column 16 and weigh bottle 19 which causes return of the relay needle to position shown in Fig. 1, and causes the parts of the control apparatus to be brought back into equilibrium as shown in Fig. 1.

The converse of the above operations takes place when the level within the vessel 10 falls to a point below that indicated by the line 15.

The invention as hereinabove described is embodied in a particular form of construction but it may be variously embodied within the scope of the following claims.

I claim:

1. A relay comprising a housing provided with an inlet orifice for admission of pressure fluid to said housing and a discharge orifice for the discharge of pressure fluid from said housing, a passageway for flow therethrough of pressure fluid from said discharge orifice and a relay needle for controlling the discharge of pressure fluid through said discharge orifice, said relay needle extending through said passageway and having longitudinal wings on the portion thereof extending through said passageway to prevent vibration thereof, said wings being spaced from the walls of the passageway to prevent contact therewith.

2. A relay comprising a housing having a piston disposed in pressure fluid within said housing and provided with an inlet orifice for the admission of pressure fluid to said housing and a discharge orifice for the discharge of pressure fluid from said housing, a conduit for pressure fluid received from said discharge orifice, a relay needle for controlling the discharge of pressure fluid through said discharge orifice, said relay needle extending through said conduit in spaced relation and having longitudinal wings positioned radially thereof on the portion thereof extending through said conduit to prevent vibration of the needle, the wings being spaced from the walls of the conduit to avoid contact therewith.

3. In a relay, a housing, a hollow piston in said housing, pressure fluid entry ports above and below said piston, a discharge orifice in said housing, a needle valve controlling the extent of discharge through said orifice for regulating fluid pressures on said piston, means on the needle valve co-acting with the fluid discharged through said orifice to prevent vibration of the needle valve and a dash-pot in said hollow piston controlling the movement of said piston.

4. In a relay, a housing, a vertical reciprocable piston member disposed in said housing and having a hollow stem, a dash-pot in said stem comprising a dash-pot piston and a dash-pot stem, the base of said dash-pot piston having an opening therein and said dash-pot stem having a cross drill opening which communicates with the opening in said piston, a sleeve mounted on said dash-pot piston stem arranged to control the extent of cross drill opening and thus control the flow of fluid from one side of the dash-pot piston to the other, said housing having pressure fluid entry ports above and below said piston member and also having a discharge orifice, a relay needle controlling the extent of discharge through said orifice, said relay needle having extensions positioned radially thereon near the base portion thereof, and means for maintaining fluid in said housing at a level above the said extensions on the needle.

WALTER H. KNISKERN.